Jan. 14, 1936.  C. B. SHEPHERD  2,027,403
CASK AND METHOD OF MAKING THE SAME
Filed Nov. 29, 1933  2 Sheets-Sheet 1

INVENTOR.
Charles B. Shepherd
BY Kenyon & Kenyon
ATTORNEYS.

Jan. 14, 1936. C. B. SHEPHERD 2,027,403
CASK AND METHOD OF MAKING THE SAME
Filed Nov. 29, 1933 2 Sheets-Sheet 2

INVENTOR.
Charles B. Shepherd
BY Kenyon & Kenyon
ATTORNEYS.

Patented Jan. 14, 1936

2,027,403

UNITED STATES PATENT OFFICE 2,027,403

CASK AND METHOD OF MAKING THE SAME

Charles B. Shepherd, Bronx, N. Y.

Application November 29, 1933, Serial No. 700,221

13 Claims. (Cl. 217—72)

This invention relates to improvements in liquid-tight containers, casks, more especially beer barrels, distillery or wine containers, or kegs and method of making the same.

The ordinary beer barrel or keg is made up of bilged staves presenting a tapering circumference on which hoops are driven or tightly wedged to hold the staves together. Expert coopers are required to build such barrels and kegs and such barrels or kegs are not liquid tight until after the staves swell by absorption of moisture to produce tight joints between the staves. Such barrels or kegs become leaky when dried out and require frequent cooperage to maintain them in condition for use. The initial cost and upkeep of such barrels and kegs is undesirably high.

An object of this invention is a strong, inexpensive cask which is liquid tight upon assembly and remains liquid tight indefinitely without further cooperage.

A cask embodying the invention consists of a cylindrical container formed of straight staves each stave being preferably of the same width throughout its length and a metal cylinder or drum enclosing the container, the drum compressing and maintaining the staves under compression at all times. In the best form of my invention, all the staves are made of the same width. The staves are so formed that they have limited contact with the cylinder. Preferably, each stave is formed with its outer face of greater curvature than the curvature of the cylinder so that each stave has limited engagement with the metal cylinder and each stave is tapered inwardly at the proper angle so that the interfaces between adjacent staves extend radially of the container. The outside diameter of the wooden container is larger than the inside diameter of the metal cylinder and the assembly is effected by forcing the container into the cylinder, thereby compressing the staves and establishing liquid-tight joints between the staves. The metal cylinder applies radial compression force to each stave along surfaces of limited width and circumferential components of this force effect liquid-tight contact between abutting staves. By reason of the difference in curvature or shape between the outer surfaces of the staves and the inner surface of the cylinder, the circumferential components of the compression force are highly effective in maintaining the abutting stave edges in liquid-tight contact and also this arrangement provides space for the staves to swell into when they absorb moisture during normal usage. The staves are maintained under compression at least equal to the assembly compression by reason of the fact that the staves are thoroughly dried before assembly and will never shrink to a narrower width than their width at the time of assembly. Therefore, the stave joint will remain liquid tight even after a long period of non-use.

Labor cost of a cask embodying the invention is very small since skilled labor is not required in the assembly of the staves. Furthermore, the staves are inexpensively produced as only straight cuts are involved which can be made with inexpensive machinery. Also, there are no steaming and bending operations, thus eliminating expense incident to the manufacture of the ordinary type keg.

Other objects, novel features and advantages of this invention will be apparent from the following specification and accompanying drawings, wherein.

Figure 1:
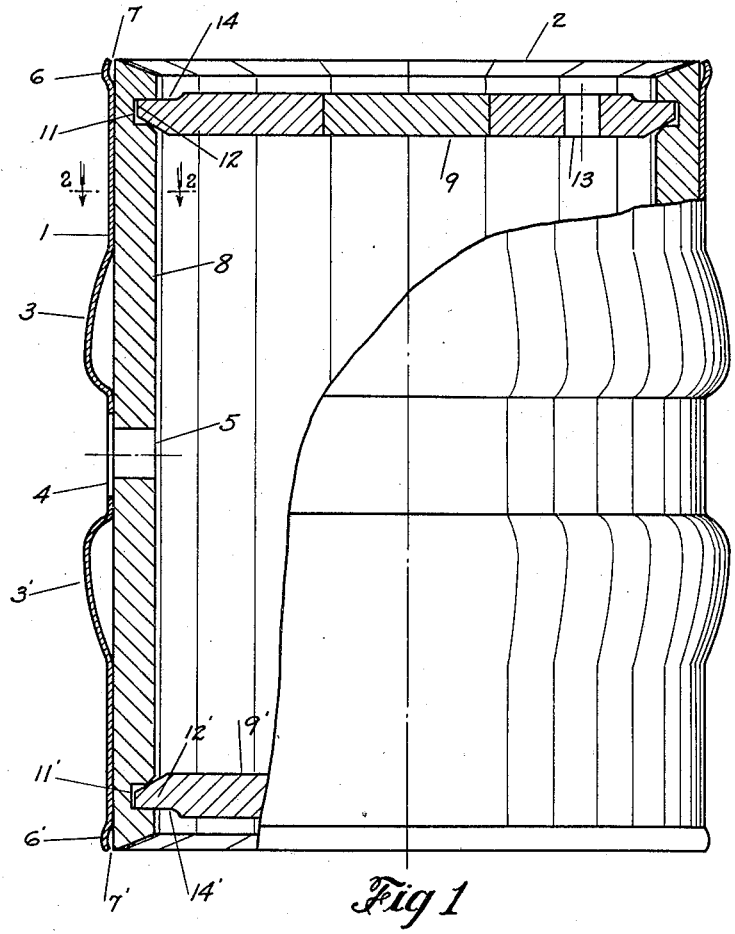
Fig. 1 is a partial sectional view of a cask embodying the invention.

The cask consists of a metal cylinder 1 within which is arranged a container 2 consisting of a plurality of staves 8 held under compression by the cylinder 1 with their abutting edges in liquid-tight contact and heads 9 and 9' having their edges 12 and 12' seated in croze-grooves 11 and 11' formed in the staves 8. The cylinder 1 is provided with annular beads 3 and 3' to facilitate rolling, up-ending, and to accommodate it to the automatic equipment standard in breweries and in other plants, and which also reinforce the cylinder. A hole 4 is provided in the cylinder 1 in register with a bung hole 5 formed in the container. The ends of the metal cylinder 1 are provided with beads 6 and 6' for reinforcement and the inside diameter of the cylinder at the points 7 and 7' is slightly larger than the maximum outside diameter of the assembled wooden container 2 to facilitate assembly.

Figure 2:
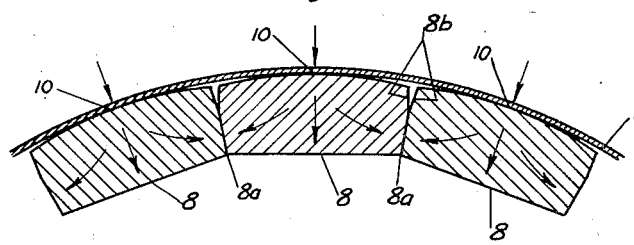
Fig. 2 is a fragmentary section on the line 2—2 of Fig. 1, illustrating the preferred form of construction.
Figure 5:
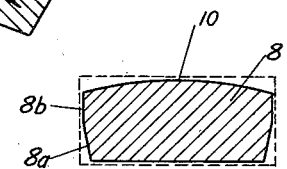
Fig. 5 is a transverse section through the preferred form of stave.

The staves 8 are of uniform size and preferably of the cross-section shown in Fig. 5, the dotted line in this figure representing the blank from which the stave is obtained. Each stave has its outer surface transversely curved at greater curvature than the curvature of the metal cylinder 1 so that it contacts with the metal cylinder only along the portion indicated by the reference numeral 10. Each stave is tapered inwardly for approximately half its thickness at the proper angle to engage the adjacent staves with the interfaces 8a extending radially of the container. This arrangement provides outwardly diverging grooves between the outer portions 8b of the lateral edges of the staves as shown in Fig. 2. The staves may be cut from similar blanks by automatic planing machines so that all the staves will be uniform in size and shape.

In the finished cask, the metal cylinder 1 contacts with the various staves only along the high portion of each stave and exerts radial pressure on the staves to hold them in assembled relation in liquid-tight contact with each other along the radial interfaces. Each stave 8 is in effect the keystone in a continuous arch and the force radially applied by the metal cylinder has circumferential components which establish the liquid tight joints between the radial interfaces of the staves. In Fig. 2, the compression forces are indicated by arrows. By reason of the limited contact between each stave and the metal cylinder there are provided expansion spaces into which the staves may swell or expand by reason of absorbing moisture from the contents of the container or by reason of the pressure during the insertion of the container into the cylinder.

The heads 9 and 9' are made up of any suitable number of previously shaped pieces fitted together in any manner that will insure tight joints preferably by doweling and gluing. The outer edges of the heads will be cut to fit in the croze grooves 11 and 11' and a bung hole 13 is provided in the head 9. Recesses 14 and 14' are provided in the heads 9 and 9' to provide additional space for gripping the ends of the container without increasing the size of the container.

Figure 6:
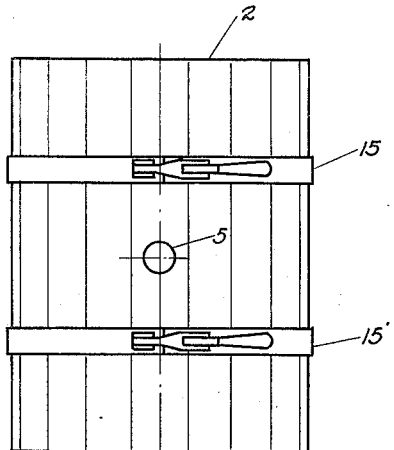
Figs. 6, 7 and 8 illustrate successive steps in the assembly of the container and cylinder.

In the manufacture of the cask above described, the blanks from which the staves are obtained are first thoroughly dried and shrunk by kiln drying. The staves are then cut from the blanks in straight form with their side faces partially tapered so that the staves can be assembled to form a cylindrical container with V-shaped grooves between the outer edges of adjacent staves, and the staves are also formed with their outer faces of such configuration that each stave will have limited contact with the cylinder when the container is initially introduced therein. Preferably the outer faces of the staves are transversely curved at a greater curvature than the curvature of the cylinder. The staves are first assembled with each other and with the heads to form the container and are held in such relation by means of the straps 15 and 15' (see Fig. 6). Once assembled in this manner, the container 2 may be readily handled and introduced into the cylinder 1. The staves are so designed that the container is of somewhat larger overall diameter than the inner diameter of the metal cylinder so that pressure is required to introduce the container into the cylinder. For example, the wooden container for a 15½ gallon keg may have its overall diameter approximately ¼" greater than the inner diameter of the metal cylinder.

Figure 7:
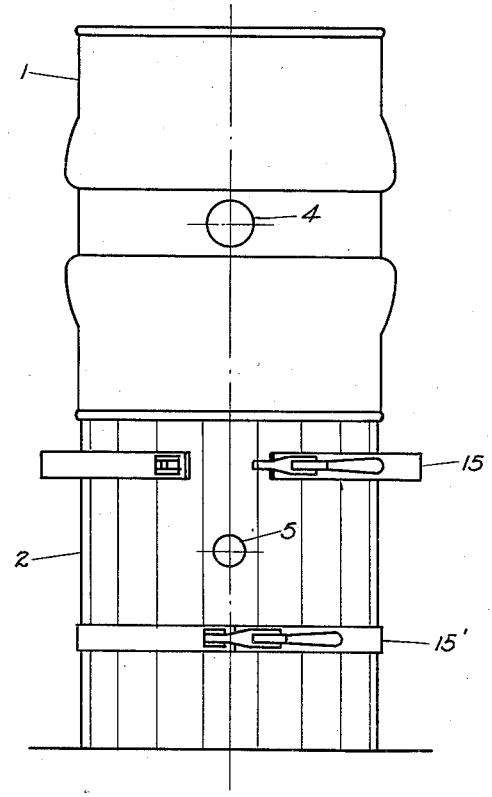
Figure 8:
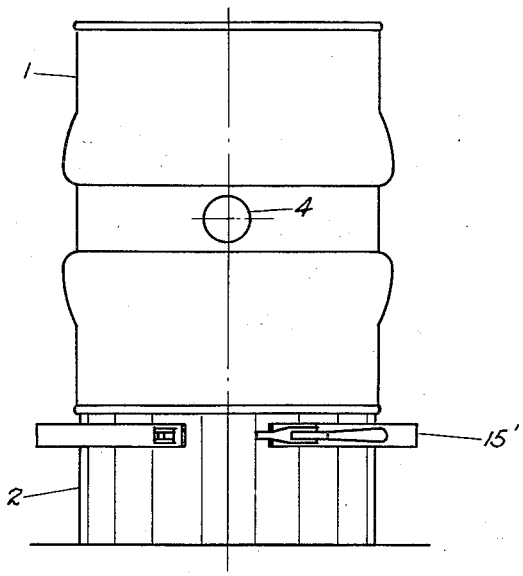

Just prior to or during the assembly operation, the outside of the container 2, excepting the ends, preferably is coated with hot paraffin or some other agent which acts not only as a lubricant, but also as a preservative of the wood. As shown in Fig. 7, one end of the cylinder 1 is next fitted over one end of the container 2, this operation being facilitated by the fact that the end of the metal cylinder is, as previously pointed out, of slightly larger diameter than the container. The metal cylinder 1 is then forced over the full length of the wooden container, the straps 15 and 15' being removed as the cylinder is forced over the container. Preferably, the metal cylinder is forced over the wooden container by means of a hydraulic press and pressure of the order of 2000 to 3000 pounds is usually required to force the metal cylinder over the wooden container.

The staves are now held in liquid tight contact by the pressure applied radially thereto through contact of the high spots of the staves with the metal container. As the staves were fully dried before being assembled into the container, the force thus applied to them will maintain them in liquid tight contact at all times since there will be no further shrinkage of the staves. Thus, the cask will be liquid tight at all times and does not depend upon swelling of the staves to insure liquid tightness. Swelling or expansion of the staves by reason of moisture absorption or during assembly is permitted by reason of the spaces provided between the staves and the metal container as a result of the configuration of the staves. In the best form of cask made according to my invention, the staves are maintained under compression in liquid-tight relation while relatively dry by said metal cylinder, the said cylinder, as I believe, being in a condition of circumferential tension and elasticity and so related to the fibrous structure of the wood in the staves as to maintain said staves in liquid-tight relation at the time of completing the assembly thereof.

Figure 3:
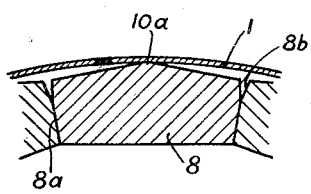
Figs. 3 and 4 are similar views showing modified forms of construction.

In the modification disclosed in Fig. 3, the outer face of each stave is formed with two slanting plane surfaces terminating in a ridge 10a which contacts with the container 1. The edges of the stave 8 are provided with faces 8a and 8b similar to the same faces provided on the preferred form of stave illustrated in Figs. 2 and 5. In this form of construction, the cylinder has limited contact with the stave along the ridge 10a and the force applied radially thereto by the cylinder has circumferential components which establish liquid-tight joints between the radial interfaces of the staves. The configuration of these staves provides expansion spaces between the staves and the cylinder or drum into which the staves may swell or expand by reason of absorbing moisture from the contents of the container or during assembly.

Figure 4:
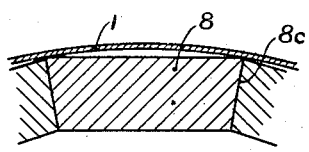

In the modification disclosed in Fig. 4, the complete edge faces 8c of each stave 8 extend radially of the container and the outer face lies in the plane joining the outer corners of the edge faces. There is thus left a space between the outer face of the stave and the cylinder and the latter has limited contact with the staves along the outer edges thereof. Compression forces are applied to the staves through the portions thereof in contact with the cylinder and the radial components of these forces press the interfaces of the staves into liquid-tight contact. The space between the outer face of the stave and the container provides for expansion of the staves by swelling because of moisture absorption from contents of the container or during assembly.

Furthermore, it is to be understood that various modifications may be made in the device above described, without in any way departing from the spirit of the invention as defined in the appended claims.

I claim:

1. A cask comprising a metal cylinder, a container enclosed and compressed and maintained under compression by said cylinder, said container being composed of straight wooden staves having their outer surfaces transversely curved at a greater curvature than the curvature of the cylinder so that each stave has limited contact with the cylinder and heads suitably mounted in the container.

2. A cask comprising a metal cylinder, a container enclosed and compressed and maintained under compression by said cylinder, said container being composed of straight wooden staves of uniform width having their outer surfaces transversely curved at a greater curvature than the curvature of the cylinder so that each stave has limited contact with the cylinder and having their edge faces partially in contact along interfaces extending radially of the container and partially diverging outwardly from each other and heads suitably mounted in the container.

3. A cask comprising a metal cylinder, a container enclosed and compressed and maintained under compression by said cylinder, said container being composed of straight wooden staves having their outer surfaces of such configuration that each stave has limited contact with the cylinder and having their edge faces partially in contact along interfaces extending radially of the container and partially diverging outwardly from each other and heads suitably mounted in the container.

4. A cask comprising a metal cylinder, a container enclosed by said cylinder and being composed of straight wooden staves of uniform width, said cylinder being so related in diameter to the container as to compress and maintain the staves under compression in liquid tight relation, and said staves having only a predeterminately limited part of their outer surfaces in contact with said cylinder and heads suitably mounted in the container.

5. A cask comprising a metal cylinder, a container enclosed by said cylinder and being composed of straight wooden staves, said cylinder being so related to the container as to compress and maintain the staves under compression in liquid tight relation, and said staves having their outer surfaces of such configuration that each stave has limited contact with said cylinder, the adjacent edge faces of said staves being partially in contact along the interfaces extending radially of the container and partially diverging outwardly from each other and heads suitably mounted in the container.

6. The method of manufacturing a cask composed of a wooden container and a metal cylinder, which consists of cutting wooden staves in straight form with their side faces tapered so that the staves can be assembled to form a cylindrical container, assembling the staves to form a container of greater external diameter than the internal diameter of the cylinder and forcing the container into the metal cylinder so as to press the staves together and hold them under compression and providing the container with heads in any suitable way.

7. The method of manufacturing a cask composed of a container and a metal cylinder which consists in cutting wooden staves in straight form with their side faces tapered so that the staves can be assembled to form a container and with their outer faces of such configuration that each stave has limited contact with the cylinder, assembling the staves to form a container of greater external diameter than the internal diameter of the cylinder, and forcing the container into the metal cylinder so as to press the staves together, and hold them under compression and providing the container with heads in any suitable way.

8. The method of manufacturing a cask composed of a wooden container and a metal cylinder, which consists in cutting wooden staves in straight form with their side faces tapered so that the staves can be assembled to form a container and with their outer faces transversely curved at a greater curvature than the curvature of the cylinder, assembling the staves to form a container, and forcing the container into the metal cylinder so as to press the staves together, and hold them under compression and providing the container with heads in any suitable way.

9. The method of manufacturing a cask composed of a wooden container and a metal cylinder, which consists in cutting wooden staves in straight form with their side faces tapered a part of the distance from their inner side outwardly so that the staves can be assembled to form a cylindrical container, the outer end of the side faces being partly cut away, assembling the staves to form a container of greater external diameter than the internal diameter of the cylinder and forcing the container into the metal cylinder whereby the outer surfaces of the staves have limited contact with the cylinder and their side faces are partially in contact along interfaces extending radially of the container and partially diverging outwardly from each other and providing the container with heads in any suitable way.

10. A cask comprising a metal cylinder, a container enclosed and compressed and maintained under compression by said cylinder, said container being composed of straight wooden staves of uniform width having only a predeterminately limited part of their outer surfaces in contact with the cylinder when the container is initially introduced into the cylinder and heads suitably mounted in the container.

11. A cask comprising a metal cylinder, a container enclosed and compressed and maintained under compression by said cylinder, said container being composed of straight wooden staves of uniform width having flat outer faces so that each stave contacts with the cylinder only along its edge portions and heads suitably mounted in the container.

12. A cask comprising a metal cylinder, a container enclosed and compressed and maintained under compression by said cylinder, said container being composed of straight wooden staves of uniform width having their outer surfaces of angular cross section so that each stave has limited contact with the cylinder and heads suitably mounted in the container.

13. As an article of manufacture, a liquid-tight cask consisting of an external metal cylinder of length substantially equal to that of the cask, and an inner wooden container consisting of straight wooden staves forming the side walls and suitable end closures or heads, the said staves being maintained under compression in liquid-tight relation while relatively dry by said metal cylinder, the said cylinder being in a condition of circumferential tension and elasticity and so related to the fibrous structure of the wood in the staves as to maintain said staves in liquid-tight relation at the time of completing the assembly thereof, the forcible compressive action of the cylinder being the initial compresion to which the staves have been subjected.

CHARLES B. SHEPHERD.